United States Patent

[11] 3,623,933

| [72] | Inventor | Henry N. Staats |
| | | Deerfield, Ill. |
| [21] | Appl. No. | 562,866 |
| [22] | Filed | July 5, 1966 |
| [45] | Patented | Nov. 30, 1971 |
| [73] | Assignee | General Binding Corporation |
| | | Northbrook, Ill. |

[54] LAMINATOR
4 Claims, 5 Drawing Figs.

[52] U.S. Cl.................................................. 156/552,
156/555, 100/93, 193/35
[51] Int. Cl...................................................... B32b 31/04
[50] Field of Search............................................. 156/301,
302, 552, 555, 583

[56] References Cited
UNITED STATES PATENTS

| 3,223,574 | 12/1965 | Childs | 156/552 |
| 2,772,717 | 12/1956 | Ware | 156/552 X |
| 2,977,271 | 3/1961 | Lutwack | 156/301 X |
| 3,155,558 | 11/1964 | Clapp | 156/552 X |

*Primary Examiner*—Douglas J. Drummond
*Attorney*—Hill, Sherman, Meroni, Gross & Simpson ABSTRACT: An automatic laminator for the lamination of sheet-form product wherein lamination occurs automatically upon the introduction of the product to a nip and a laminating apparatus and in which lamination discontinues upon passage of the product through the nip. Adjustment means are provided preventing movement of the laminating film through the laminating nip except under circumstances in which the product to be laminated is present in the nip.

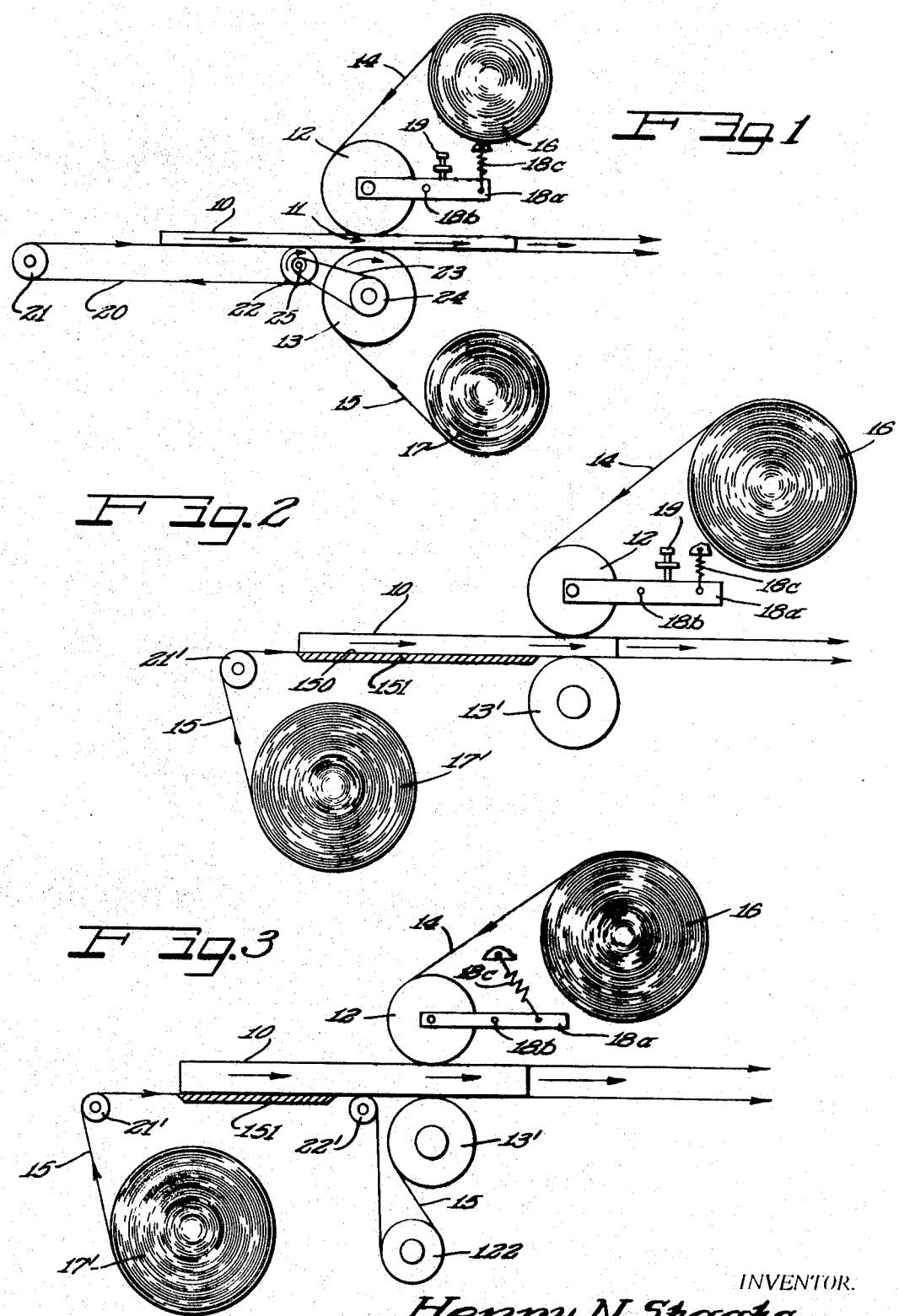

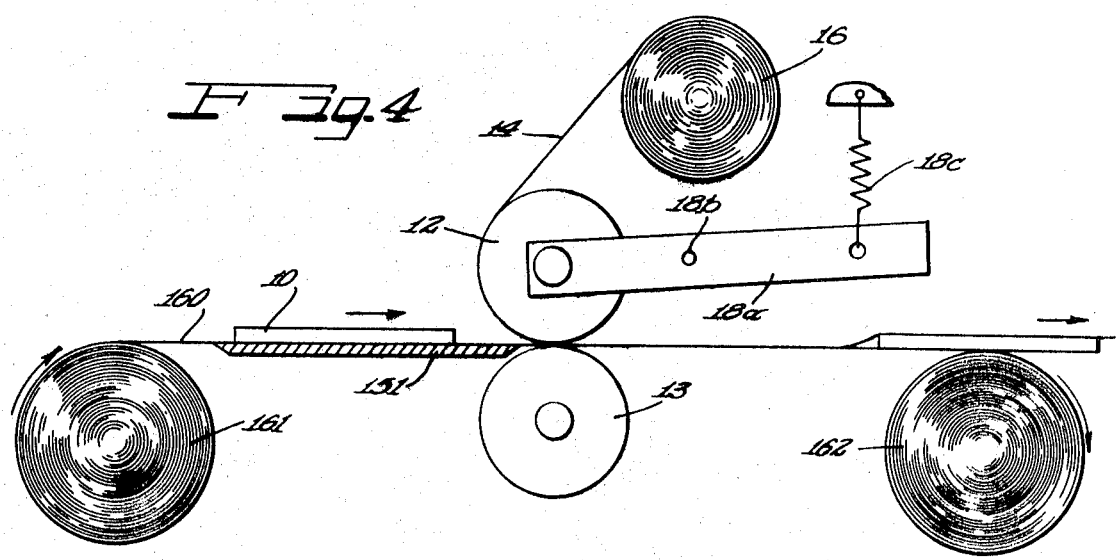
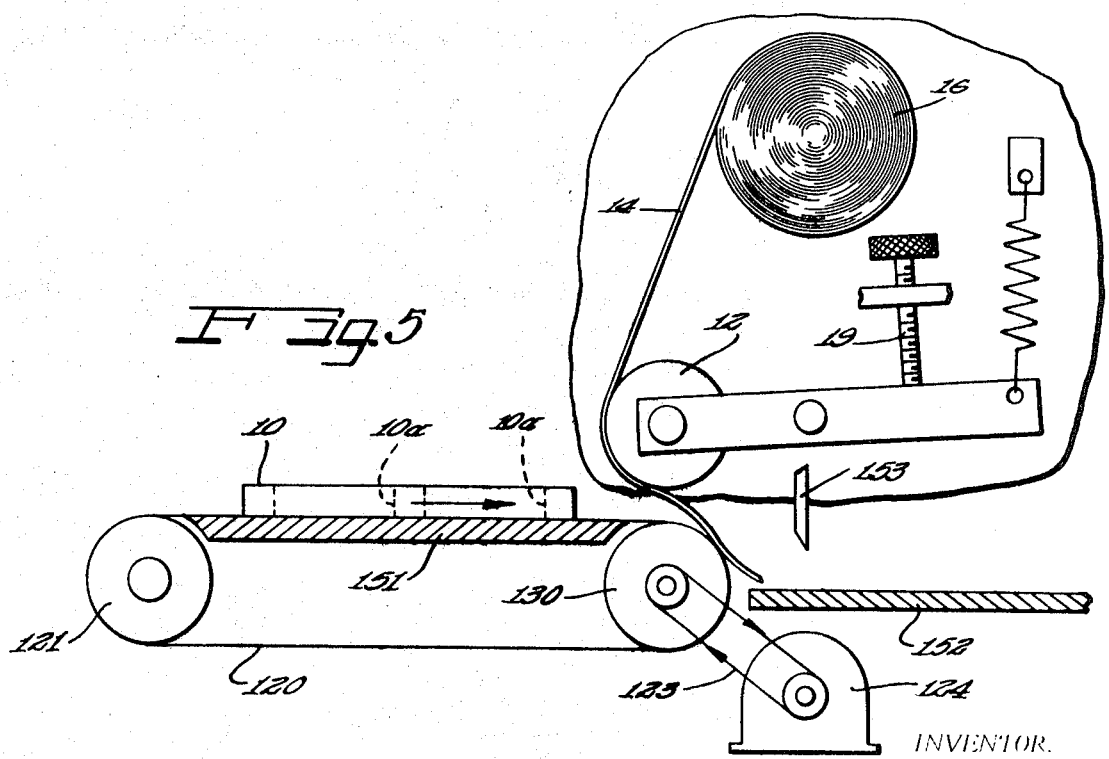

LAMINATOR

The present invention relates to the lamination of sheet material to a sheet-form product or other laminate. More particularly, the present invention relates to a novel and substantially improved method and apparatus for applying a film of heat-sensitive laminate material to one or both sides of a product to be laminated.

As those skilled in the art of lamination with heat-sensitive film materials are aware, it has been common practice for many years to laminate such materials by passing them between a plurality of pressure rolls in the presence of heat so as to bond them to a product or to each other. In actual practice, the desirability of laminating products with a covering surface of protective laminate material has become very widespread. In fact, the need for an almost infinite variety of modes of operation has occurred. For example, it is often desired to laminate only one side of a sheet of product material without providing a lamination on the other side thereof. It is desirable that the same machine capable of accomplishing such single-sided lamination be capable of two-sided lamination. Similarly, it is desired that the apparatus have sufficient flexibility to permit hand-feeding the product to be laminated into the machine or, alternatively, to provide automatic conveyor means for accurately positioning the product in the laminator nip at the time of introduction of the product. It is also desirable to be able to position a product about to be laminated in an exact predetermined position at the time of introduction into the nip and to laminate such product satisfactorily on one or both sides while retaining perfect product alignment.

Still further, it has been found desirable that a laminating machine capable of laminating one or both sides of a product be operative to heat and apply the laminating film to the product only during the time of passage of the product through the nip. Similarly, it is desired hat during times that the product is not progressing through the laminator, the laminating film be retained in a substantially unheated condition incapable of adhering to the laminating rolls, either hot or cold.

In accordance with the present invention, I have provided a self-actuating laminating system in which the laminating apparatus idles effectively between successive insertions of product. During such time as the product to be laminated is positioned between the pressure nip of the laminating apparatus, power is applied to the product to cause it to move through the laminator, and at the same time the laminating film is heated and directed against the product under pressure. In accordance with the present invention the product is positively aligned with respect to the nip in each and every case so that perfect alignment of the product is maintained at all times and the temperature of the laminating film is similarly under constant control.

In accordance with the present invention, a conveyor is provided which is synchronized with the movement of the laminating rolls. In some forms of the invention the conveyor comprises in actuality the film of laminating material that is passed through the laminating rolls with the products thereby providing automatic absolute synchronization between the conveyor and the laminating rolls. In further accord with the present invention, laminating rolls are provided with a normally disengaged position in which rotation of the laminating rolls does not cause lamination unless and until product is inserted between the laminating rolls, at which time the product is automatically driven between the rolls and laminated on at least one side thereof.

Still another form of the invention comprises a construction in which the conveyor comprises a separable, continuous layer of film which supports the product during its passage to and through the laminating rollers for supporting the product during its passage and which, after serving its function of product conveyance and product alignment, is separated from the product for subsequent reuse as a conveyor media.

It is, accordingly, an object of the present invention to provide an automatic self-actuating laminator providing an integrated conveyor and capable of several different modes of lamination operation.

Another object of the invention is to provide a laminator having a constantly driven laminator roll which is effective to move products through the laminator only during periods in which the product is itself between the laminating rolls of the apparatus.

Still another object of the present invention is to provide a laminating apparatus capable of automatic lamination of one side only of a product.

Still a further object of the invention is to provide a laminator providing automatic conveyance of the product to be laminated into the lamination pressure roll system directly upon the laminating film which is permanently laminated to the product during passage through such rolls.

A feature of the invention resides in the provision of a spring-biased laminating roll adjustable to position the laminating rolls apart from each other a distance greater than the thickness of the laminating material employed in lamination but less than the combined thickness of the laminating material and the product being laminated.

Still other and further objects and features of the invention will at once become apparent to those skilled in the art from a consideration of the attached specification and drawings wherein several embodiments of the invention are diagrammatically illustrated by way of illustration only and wherein:

FIG. 1 comprises a side-elevational view in diagrammatic form of a laminating device constructed to laminate both sides of a product conveyed therethrough on a synchronized conveyor;

FIG. 2 is a modified form of the invention wherein a laminator is shown in diagrammatic form for laminating both sides of a product, and simultaneously conveying the product through the laminating machine upon a conveyor formed by one of the laminating films;

FIG. 3 is a modified form of the laminating apparatus shown in FIG. 2 wherein the laminating film constituting the product conveyor is looped into an increased area of contact with its laminator roll;

FIG. 4 is a diagrammatic illustration of a still further modified form of the invention wherein only one side of a product is laminated; and FIG. 5 is a side-elevational view of a modified form of the apparatus shown in FIG. 4 wherein the uppermost laminating roll is resiliently deflectable in an adjustable manner to automatically provide film heating and pressure for lamination only when a product to be laminated is engaged between the lamination roll.

As above indicated, the drawings illustrate various embodiments of the present invention in diagrammatic form. In FIG. 1, a product 10 comprising a sheet of material to be laminated on both sides is introduced into the nip, generally indicated at 11 formed between upper and lower laminating rolls indicated at 12 and 13 respectively. Laminating film 14 and 15 is fed to the respective pressure rolls 12 and 13 from respective supply rolls 16 and 17 and is pressed into contact with the product material 10 by pressure applied by the rolls 12, 13 under the influence of spring-biasing means 18. The biasing means illustrated comprises roll-carrying lever arms 18a supporting opposite ends of one of the rolls, roll 12 for example, for pivotal movement about pivots 18b under the influence of spring 18c. Adjustable stop 19 is provided to limit movement of rolls 12 and 13 toward each other as set forth below.

In the embodiment illustrated in FIG. 1, the material 10 is introduced between the laminating pressure rolls 12 and 13 by way of a conveyor belt 20 entrained about pulleys 21, 22. The belt 20 is driven at the same linear peripheral velocity as the surface of pressure roll 13 by means of a drive such as shown at 23. While it will be appreciated that various forms of drive mechanism may be shown, the relatively simple belt drive 23 entrained about pulleys 24 and 25 of respective diameters matched to provide identical peripheral velocities for the belt 20 and the pressure roller 13 is eminently satisfactory. It is important that the velocity of the belt 20 be no greater than the velocity of the pressure surface of the driven roll, for example, roll 13, but it will be appreciated that the conveyor 20 may be operated at a velocity slightly less than the velocity of the pressure rolls 12, 13, if desired. With the arrangement thus shown, the product 10 may be precisely positioned upon the conveyor 20 in its centered position and in view of the very slight gap between rolls 22 and 13, the product 10 will not become appreciably misaligned during transfer from the conveyor 20 to the passage between rolls 12 and 13.

As described above, the pressure rolls 12 and 13 are normally resiliently biased toward each other by means of a spring, such as that shown at 18c, applied to one or both of the rolls. In the embodiment illustrated roll 12 moves up and down, carried by the arms 18a pivotal about pivot points 18b. The nip between the rolls is adjusted to a minimum dimension, however, by the adjustable stop 19. This stop is adjusted to provide a minimum nip clearance which is greater than the thickness of the combined laminating films 14 and 15 but less than the combined thickness of the films 14 and 15 with the product 10 sandwiched therebetween. Accordingly, when no product 10 is introduced into the nip no friction will be applied to the surfaces of the films 14 and 15 at the nip. Under these circumstances the rolls 12, 13 will idle without pulling any laminating film through the apparatus. It will, of course, be appreciated that if only one of the rolls, for example roll 13, is driven, it will idle while the other undriven roll 12 stands stationary until such time as a product is introduced into the nip. Of course, when a product 10 is introduced into the nip the rolls are urged slightly apart by the product in combination with the films 14 and 15 and the drive of the single driven roll 13 will be transmitted to roll 12 through the product and the laminating film. It will be understood that roll 12 may be directly driven, or driven through roll 13 by means of a positive drive, but for many installations such dual drive is unnecessary.

It will be seen that as a result of the above construction, an automatic operation may be provided. A plurality of products 10 may be fed at constant or irregular intervals to the pressure rolls 12, 13 but the laminating films 14 and 15 move through the laminating rolls only at such time as product 10 is introduced into the nip. Accordingly, independently of the spacing of the product 10 on the conveyor 20, it will leave the apparatus laminated to films 14 and 15 substantially at regular intervals, with a minimum of waste of laminating film between product portions.

Many variations of the above system may readily be constructed to achieve specialized results. For example, the laminating film 15 may be eliminated by removal from the distribution roll 17 or merely by failure to introduce it into the nip around roll 13. Under such circumstances, the system operates precisely as described above except that only the upper side of the product 10 is laminated with a film. Alternatively, the film 14 may be eliminated in the same manner.

Ordinarily, it is contemplated that the laminate films 14,15 be of a heat-sealing type such as polyethylene or multilayer laminate structures of polyethylene combined with Mylar. Under such circumstances it is desired that the laminate be heated at its point of lamination with the product 10. This may readily be accomplished by heating the rolls 12 and 13 by conventional roll-heating means either internally within the hub of the rolls or peripherally at the surface of the rolls in a manner such as, for example, illustrated in my copending application Staats et al., Ser. No. 457,134, filed May 19, 1965 entitled "LAMINATING APPARATUS." If the laminate film 14,15 is pressure-sensitive and capable of lamination without the application of heat, the rollers 12,13 may, of course, be left unheated, either by the absence of heating elements or by operating the laminating apparatus with the heaters turned off. It will be apparent, of course, that if one or the other film supplies is not being used, and the apparatus is, accordingly, operating as a one-sided laminator only, the heating element of the roll over which no film is passed will ordinarily be deenergized.

As explained above, it is desired that the conveyor means provided in the system deliver the product to the laminating rolls at a surface velocity equal to the surface velocity of the driving roll. In circumstances in which the product is to be laminated on its underside, the conveyor may actually comprise the laminating film itself. Arrangements of this type are shown in FIGS. 2 and 3. As shown in FIG. 2, pressure rolls 12 and 13' are shown assembled generally in the manner illustrated in FIG. 1. A film 14 is supplied around roll 12 from a dispensing roll 16. Similarly, the roll 12 is biased downwardly toward roll 13' by means of the spring 18c biasing lever 18a about pivot 18b. As in the construction shown in FIG. 1, a stop 19 may, if desired, be provided. Laminating film for lamination to the underside of product 10 in FIG. 2 is distributed from roll 17' about a guide 21' from whence the film 15 passes over roll 13'. In so doing, the film forms a conveyor, as at 150 under the product 10. If desired, platform 151 may be used beneath the film to provide a support in situations where the product 10 is relatively heavy. In the arrangement shown in FIG. 2 it is unnecessary to separately drive any conveyor since the film 15 is drawn through the nip by the application of power to either roll 12 or roll 13'. If it is desired that the conveyor form film 15 be operable continuously through the apparatus, stop 19 may be eliminated so that a nip pressure is constantly maintained. This pressure will, of course, continuously draw film, and hence the conveyor film 15, through the nip whether or not an upper laminate film 14 is employed. If it is desired that the apparatus act automatically to laminate product only when product is introduced, and hence to minimize waste of film, as above described, the stop 19 may be applied. It will be clear, of course, that in the form shown in FIG. 2, film 14 may be employed or not, as desired.

In the embodiment illustrated in FIG. 3 the film 15 is again employed as a conveyor. The apparatus shown in FIG. 3 is in all respects the same as that shown in FIG. 2 except that two additional guide rollers 22' and 122 are provided. These rollers guide the film 15 downwardly into a position below roller 13' so that upon movement of the film 15 upwardly over the roller 13' additional heat may be applied to the film. This feature is desired when the short period of time the film is in contact with roll 13' in the embodiment shown in FIG. 2 is insufficient to soften the film 15 for satisfactory lamination. In the arrangement shown in FIG. 3, also, the stop 19 has been deleted, thereby providing a laminating apparatus with a continuously operating conveyor as long as one or the other of rolls 12, 13' is driven.

In the embodiment of the invention shown in FIG. 4, a one-sided laminating apparatus is shown. There, roll 12 is supplied with film 14 from a supply roll 16. The roll 12 is mounted resiliently on arms 18a pivotally mounted about points 18b and biased downwardly against roll 13 by spring 18c. The product 10 is conveyed to the nip between rolls 12 and 13 by a web of material 160 which is dispensed from a supply drum 161 and is rewound upon drum 162 after passage over table 151 and through the nip. The material 160 may be Kraft paper or the like which readily separates from the laminating film 14 so that the film 14 may be laminated directly to the top of the product 10 in an overlapping manner without sticking to the roll 13. After lamination the Kraft paper pulls away from the product as the product is lifted upwardly therefrom. Alternatively, the product may be automatically stripped of the paper 160 by the rolling action of the paper about the pickup roll 162. It is possible, similarly, to provide a continuous web of a film material not laminatable. In such a system, not shown, the supply and pickup rolls 161 and 162, respectively, act as continuous pulleys, with the film 160 being entrained about both of them in the manner of a conveyor belt (similar to that shown at 20 in FIG. 1), with the upper surface of the conveyor belt passing through the nip and the lower, returning, surface of the conveyor belt passing below the roll 13 for retraining about roll 161.

In the embodiment of the invention illustrated in FIG. 5, a continuous conveyor 120 is employed in a simplified manner. As there shown, the conveyor 120 passes over a guide roll 121, table 151 and directly over the lower pressure roll 130 which acts to directly drive the conveyor 120 and as a pressure roll per se. The roll 130 is driven by any conventional means 123 and motor 124. The product 10 is introduced into the nip between roll 130 and the roll 12, identical in construction, again, to the form shown in FIG. 1. The film 14, dispensed from roll 16 passes between rolls 12 and 130 where it lies loosely unless the product 10 is introduced. This relationship is provided by stop 19 in the manner above described. This device provides an automatic one-sided laminator in which a laminate is applied only to the top surface of the product 10 and only at such times as the product 10 is introduced into the nip. As the product leaves the rolls 12, 130, it is discharged upon a work table 152. The film 14 may be severed by any conventional means, such as for example, a vertical knife blade 153 or the like. This single-sided lamination technique permits, for example, a simple packaging technique. As shown in FIG. 5, the product 10 may comprise a relatively thick cardboard member or the like having a plurality of apertures pierced therethrough, as at 10a. The product may then be passed through the laminator at which stage a film 14 is applied to one side of the product. The product may then be turned upside down, filled with a product to be packaged, and reintroduced into the single-sided laminator for completion of an inexpensive yet highly effective package.

It will be apparent from a consideration of the above number of illustrated and described embodiments, that many variations may be made without departing from the scope of the present invention. It will be understood, for example, that the spring suspension system illustrated for supporting roll 12 may be applied to roll 13 or that other forms of spring suspension, such as illustrated in the Staats et al. application noted above, may be used. It is, accordingly, my intent that the scope of the present invention be limited solely by that of the hereinafter appended claims.

I claim as my invention:

1. In combination in a laminating apparatus, a pair of rolls providing a laminating nip therebetween, means resiliently biasing one of said rolls toward the other, stop means for adjustably limiting the movement of said one roll toward the other to thereby provide a minimum nip spacing, means heating one of said rolls, conveyor means for transporting a product into said nip, means supplying a laminating film to said nip and in contact with said heated roll for heating thereby and pressure contact with said product on the side of said product facing said heated roll, means driving at least one of said rolls, said minimum spacing being greater than the thickness of said film and smaller than the combined thicknesses of said film and said product whereby said film is not pushed through said nip except when product is positioned thereagainst in said nip.

2. The laminating apparatus in accordance with claim 1 wherein cutting means is provided downstream of the travel of said product relative to said rolls.

3. In combination in a laminating apparatus, a pair of rolls providing a laminating nip therebetween, means resiliently biasing said rolls toward each other, stop means for adjustably limiting the movement of said rolls toward each other, conveyor means for transporting a product into said nip, means supplying a laminating film to said nip and in contact with one of said rolls for pressure contact with said product on the side of the product facing said one roll, means driving at least one of said rolls, said rolls being spaced to provide a nip spacing greater than the thickness of said film and smaller than the combined thicknesses of said film and said product whereby said film is not moved through said nip by said driven roll except when product is positioned thereagainst in said nip.

4. In combination in a laminating apparatus, a pair of rolls providing a laminating nip therebetween, means resiliently biasing said rolls toward each other, stop means for adjustably limiting the movement of said rolls toward each other, means heating one of said rolls, a conveyor means for transporting a product into said nip, means supplying a laminating film to said nip and in contact with said one roll for heating thereby and pressure contact with said product on the side of the product facing said one roll, and means driving at least one of said rolls, said rolls being spaced to provide a nip spacing greater than the thickness of said film and smaller than the combined thicknesses of said film and said product whereby said film is not drawn through said nip except when said product is positioned thereagainst in said nip.

* * * * *